(12) United States Patent
Nagura et al.

(10) Patent No.: US 9,810,374 B2
(45) Date of Patent: Nov. 7, 2017

(54) GAS-FILLING APPARATUS AND METHOD FOR FILLING GAS

(71) Applicant: Kobe Steel, Ltd., Kobe-shi (JP)

(72) Inventors: Kenji Nagura, Takasago (JP); Hitoshi Takagi, Takasago (JP); Takuro Uba, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 219 days.

(21) Appl. No.: 14/532,185

(22) Filed: Nov. 4, 2014

(65) Prior Publication Data

US 2015/0167895 A1 Jun. 18, 2015

(30) Foreign Application Priority Data

Dec. 13, 2013 (JP) .................................. 2013-257841

(51) Int. Cl.
*B65B 31/00* (2006.01)
*F17C 5/06* (2006.01)
(Continued)

(52) U.S. Cl.
CPC ................ *F17C 5/06* (2013.01); *F17C 5/007* (2013.01); *F17C 13/025* (2013.01);
(Continued)

(58) Field of Classification Search
CPC .......... F17C 5/007; F17C 5/06; F17C 13/025; F15B 1/022
See application file for complete search history.

(56) References Cited

U.S. PATENT DOCUMENTS 3,719,196 A * 3/1973 McJones .................... F17B 1/12
137/110
3,786,207 A * 1/1974 Houston ................ H01H 36/02
141/207
(Continued)

FOREIGN PATENT DOCUMENTS

EP 1 760 388 A2 3/2007
JP 8-68497 A 3/1996
(Continued)

OTHER PUBLICATIONS

Extended European Search Report dated Aug. 4, 2015 in Patent Application No. 14191673.4.

*Primary Examiner* — Patrick M Buechner
*Assistant Examiner* — Randall Gruby
(74) *Attorney, Agent, or Firm* — Oblon, McClelland, Maier & Neustadt, L.L.P.

(57) ABSTRACT

A gas-filling apparatus includes a gas flow passage including an inflow end to which a gas supply source is connectable and an outflow end to which a pressure accumulator is connectable, a compressor, a storage portion, and an operation control portion conducting a first compression filling operation in which a gas supplied from the gas supply source connected to the inflow end is compressed by the compressor to be discharged from the outflow end and a second compression filling operation in which the gas stored in the storage portion is compressed by the compressor to be discharged from the outflow end, the operation control portion conducting the first compression filling operation until a pressure of the gas at the outflow end reaches a predetermined pressure and executing a control for shifting the first compression filling operation to the second compression filling operation when the pressure has reached the predetermined pressure.

9 Claims, 8 Drawing Sheets

(51) Int. Cl.
*F17C 5/00* (2006.01)
*F17C 13/02* (2006.01)

(52) U.S. Cl.
CPC .............. *F17C 2205/0326* (2013.01); *F17C 2205/0335* (2013.01); *F17C 2221/012* (2013.01); *F17C 2223/0123* (2013.01); *F17C 2223/033* (2013.01); *F17C 2223/035* (2013.01); *F17C 2225/0123* (2013.01); *F17C 2225/036* (2013.01); *F17C 2227/0164* (2013.01); *F17C 2227/041* (2013.01); *F17C 2227/046* (2013.01); *F17C 2250/032* (2013.01); *F17C 2250/043* (2013.01); *F17C 2265/063* (2013.01); *F17C 2265/065* (2013.01); *F17C 2270/0139* (2013.01); *Y02E 60/321* (2013.01)

(56) References Cited

U.S. PATENT DOCUMENTS

| | | | | |
|---|---|---|---|---|
| 3,844,306 A * | 10/1974 | Hill | ............ | F17C 5/06 137/256 |
| 4,527,600 A * | 7/1985 | Fisher | ............ | B67D 7/08 141/4 |
| 4,646,940 A * | 3/1987 | Kramer | ............ | F17C 13/025 141/197 |
| 4,813,461 A * | 3/1989 | Fanshawe | ............ | B65B 31/003 141/4 |
| 4,856,284 A * | 8/1989 | Mattiola | ............ | F17C 5/005 137/255 |
| 5,107,906 A * | 4/1992 | Swenson | ............ | F17C 9/02 141/11 |
| 5,207,530 A * | 5/1993 | Brooks | ............ | F17C 1/007 405/53 |
| 5,406,988 A * | 4/1995 | Hopkins | ............ | F17C 7/00 123/527 |
| 5,488,978 A * | 2/1996 | Kountz | ............ | F17C 5/007 141/18 |
| 5,513,678 A * | 5/1996 | Schultz | ............ | F17C 5/06 141/198 |
| 5,673,735 A * | 10/1997 | Crvelin | ............ | F17C 13/045 137/256 |
| 6,079,459 A * | 6/2000 | Klotz | ............ | F17C 5/002 141/18 |
| 6,152,191 A * | 11/2000 | Chan | ............ | F17C 5/007 141/18 |
| 6,152,192 A * | 11/2000 | Klotz | ............ | F17C 5/002 141/104 |
| 6,263,924 B1 * | 7/2001 | Grosser | ............ | B60K 15/00 141/102 |
| 6,598,624 B2 * | 7/2003 | Togasawa | ............ | F16K 17/30 141/1 |
| 6,645,653 B2 * | 11/2003 | Kashiwagi | ............ | B60L 11/1881 429/415 |
| 6,655,422 B2 * | 12/2003 | Shock | ............ | B65B 31/00 141/1 |
| 6,792,981 B1 * | 9/2004 | Manning | ............ | F17C 5/06 141/18 |
| 6,904,944 B2 * | 6/2005 | Satou | ............ | F17C 5/00 141/100 |
| 7,168,464 B2 * | 1/2007 | Diggins | ............ | F17C 7/02 137/263 |
| 7,316,859 B2 * | 1/2008 | Christie | ............ | H01M 8/04089 137/109 |
| 7,354,464 B2 * | 4/2008 | Kenefake | ............ | C01B 3/38 422/106 |
| 7,459,008 B2 * | 12/2008 | Aylsworth | ............ | B01D 53/0454 128/204.21 |
| 7,497,191 B2 * | 3/2009 | Fulton | ............ | G06Q 30/0225 123/3 |
| 7,621,302 B2 * | 11/2009 | Shock | ............ | F17C 5/06 141/104 |
| 8,360,112 B2 * | 1/2013 | Allidieres | ............ | F17C 5/007 141/102 |
| 9,074,730 B2 * | 7/2015 | Cohen | ............ | F17C 5/06 |
| 9,151,448 B2 * | 10/2015 | Cohen | ............ | F17C 5/06 |
| 2003/0164202 A1 * | 9/2003 | Graham | ............ | B60S 5/02 141/98 |
| 2005/0000802 A1 * | 1/2005 | Hobbs | ............ | C01B 3/34 204/277 |
| 2005/0103400 A1 * | 5/2005 | Eichelberger | ............ | B60S 5/02 141/231 |
| 2006/0118175 A1 * | 6/2006 | Mathison | ............ | B60K 15/00 137/256 |
| 2007/0034283 A1 * | 2/2007 | Plummer | ............ | F17C 6/00 141/234 |
| 2007/0051423 A1 * | 3/2007 | Handa | ............ | F17C 5/00 141/94 |
| 2008/0216913 A1 * | 9/2008 | Kederer | ............ | F17C 5/007 141/2 |
| 2008/0245437 A1 * | 10/2008 | Shige | ............ | B60L 11/1881 141/4 |
| 2009/0133674 A1 * | 5/2009 | Lee | ............ | B63B 25/14 123/527 |
| 2009/0229701 A1 * | 9/2009 | Allidieres | ............ | F17C 5/06 141/2 |
| 2009/0250138 A1 * | 10/2009 | Bavarian | ............ | F17C 7/00 141/4 |
| 2010/0193070 A1 | 8/2010 | Allidieres | | |
| 2011/0240139 A1 * | 10/2011 | Ding | ............ | F17C 5/007 137/171 |
| 2012/0031525 A1 * | 2/2012 | Wonders | ............ | F17C 5/06 141/4 |
| 2012/0125482 A1 * | 5/2012 | Mori | ............ | F17C 5/007 141/98 |
| 2014/0102587 A1 | 4/2014 | Nagura et al. | | |
| 2014/0196814 A1 * | 7/2014 | Nagura | ............ | F17C 5/06 141/82 |
| 2014/0332114 A1 | 11/2014 | Nagura et al. | | |
| 2015/0153005 A1 * | 6/2015 | Takano | ............ | F17C 5/06 141/4 |

FOREIGN PATENT DOCUMENTS

| | | |
|---|---|---|
| JP | 8-100895 A | 4/1996 |
| JP | 2010-534308 A | 11/2010 |
| JP | 2013-130218 A | 7/2013 |
| JP | 5248607 | 7/2013 |
| WO | WO 2009/013415 A1 | 1/2009 |
| WO | WO 2013/001824 A1 | 1/2013 |
| WO | WO 2013/094408 A1 | 6/2013 |

* cited by examiner

GAS-FILLING APPARATUS AND METHOD FOR FILLING GAS

BACKGROUND OF THE INVENTION

Field of the Invention

The present invention relates to a gas-filling apparatus and a method for filling gas.

Description of the Related Art

A conventional gas-filling apparatus for supplying gas to a pressure accumulator is disclosed in JP 5248607B (which will be hereinafter referred to as Reference 1). As illustrated in FIG. 10, the gas-filling apparatus disclosed in Reference 1 is provided with a gas flow circuit 63 in which a compressor 61, buffer containers 62, and on-off valves V61 are arranged. A gas supply source 65 is connected to the gas flow circuit 63; thereby, the gas can be supplied from the gas supply source 65. In addition, a tank mounting unit (such as a vehicle) 66 is connectable to the gas flow circuit 63 and the gas can be supplied through the gas flow circuit 63 to a tank of the tank mounting unit 66. In particular, in the case of supplying the gas to the tank of the tank mounting unit 66, at the same time as the gas stored in the buffer containers 62 is supplied to the tank (pressure equilibrium), the gas supplied from the gas supply source 65 is compressed by the compressor 61 to be supplied to the tank without passing through the buffer containers 62. Thus, in the gas-filling apparatus disclosed in Reference 1, the supply of the gas from the buffer containers 62 and the supply of the gas from the gas supply source 65 through the compressor 61 are conducted at the same time; thereby, a prompt gas filling can be realized.

In the gas-filling apparatus disclosed in Reference 1, the gas is supplied simultaneously from two systems; therefore, the prompt gas filling can be realized. However, in the simultaneous supply of the gas from the two systems, a volume of the gas compressed by the compressor 61 and a flow rate of the gas discharged from each of the buffer containers 62 need to be adjusted as a pressure of the gas in the tank and a pressure of the gas in the buffer 62 increase. Therefore, a control for filling of the gas into the tank by the gas-filling apparatus may be complicated.

Accordingly, the present invention is made in view of the above-mentioned conventional gas-filling apparatus, and it is mainly objected to avoid a complicated control for filling of gas into a pressure accumulator by a gas-filling apparatus.

SUMMARY OF THE INVENTION

In order to attain the aforementioned object, according to the present invention, a gas-filling apparatus invention includes a gas flow passage including an inflow end to which a gas supply source is connectable and an outflow end to which a pressure accumulator is connectable, a compressor connected to the gas flow passage, a storage portion connected to the gas flow passage, and an operation control portion for executing a control for a first compression filling operation in which a gas supplied from the gas supply source connected to the inflow end is compressed by the compressor to be discharged from the outflow end and a second compression filling operation in which the gas stored in the storage portion is compressed by the compressor to be discharged from the outflow end, the operation control portion being configured to conduct the first compression filling operation until a pressure of the gas at the outflow end or a pressure corresponding to the pressure of the gas at the outflow end reaches a predetermined pressure and to conduct a control for shifting the first compression filling operation to the second compression filling operation when the pressure of the gas at the outflow end or the pressure corresponding to the pressure of the gas at the outflow end has reached the predetermined pressure.

In the present invention, the first compression filling operation is conducted and is thereafter shifted to the second compression filling operation. That is, in the event of supplying the gas to the pressure accumulator, the supply of the gas from the gas supply source and the supply of the gas from the storage portion are not conducted at the same time. Therefore, a complicated control for filling of the gas into the pressure accumulator by the gas-filling apparatus can be avoided. In addition, the first compression filling operation is conducted until the pressure of the gas at the outflow end or the pressure corresponding to the pressure of the gas at the outflow end reaches the predetermined pressure. Thereafter, the first compression filling operation is shifted to the second compression filling operation; therefore, a range of pressure increase of the gas in the compressor can be reduced. As a result, the compressor may be downsized. That is, the number of compression stages of a compression chamber of the compressor can be reduced; therefore, a smaller compressor can be adopted.

Here, in the second compression filling operation, in a case where a ratio of the pressure of the gas at the outflow end relative to a pressure of the gas in the storage portion is equal to or greater than a storing start threshold preliminarily set for said ratio, the operation control portion may conduct a storage operation for storing the gas in the storage portion on the basis of the ratio. Alternatively, the storage operation may be performed on the basis of the pressure of the gas in the storage portion when the pressure of the gas in the storage portion is equal to or less than a preliminarily set storing start threshold.

In such a configuration, in the second compression filling operation for supplying the gas from the storage portion to the pressure accumulator, the storage operation is conducted in a case where the pressure of the gas in the storage portion is decreased in accordance with the supply of the gas. Therefore, the pressure of the gas in the storage portion can be obtained to be equal to or greater than a predetermined value. As a result, a compression ratio in the compressor can be reduced and the compressor may be downsized. In other words, the number of compression stages of the compression chamber of the compressor can be reduced; therefore, a smaller compressor can be adopted.

The gas flow passage includes a first flow passage in which a first on-off valve is arranged and which connects the inflow end to a suction portion of the compressor, a second flow passage in which a second on-off valve is arranged and which connects a discharge portion of the compressor to the storage portion, a third flow passage in which a third on-off valve is arranged and which connects the second flow passage to the outflow end, and a fourth flow passage in which a fourth on-off valve is arranged and which connects the storage portion to the suction portion of the compressor so that the storage portion and the suction portion are communicated with each other. In such a case, when conducting the second compression filling operation, the operation control portion allows the fourth and third on-off valves to be opened and allows the first and second on-off valves to be closed.

According to the present invention, a gas-filling apparatus includes a gas flow passage including an inflow end to which a gas supply source is connectable and an outflow end to which a pressure accumulator is connectable, a first compressor connected to the gas flow passage, and a storage portion connected to the gas flow passage, the gas-filling apparatus conducting a storage operation in which a gas from a gas supply source connected to the inflow end is supplied to the storage portion to be stored in the storage portion, a differential pressure filling operation in which the gas stored in the storage portion is discharged from the outflow end by a difference between a pressure of the gas stored in the storage portion and a pressure of the gas in the pressure accumulator or a pressure corresponding to the pressure of the gas in the pressure accumulator, and a compression filling operation in which the gas stored in the storage portion is compressed by the first compressor to be discharged from the outflow end, the gas-filling apparatus shifting to the compression filling operation after the differential pressure filing operation.

In the present invention, the differential pressure filling operation is conducted and is thereafter shifted to the compression filling operation. Then, the gas is compressed by the first compressor to be discharged from the outflow end. That is, in the case of supplying the gas to the pressure accumulator, the gas supply by use of the pressure difference and the gas supply by use of the compression by the first compressor are not conducted at the same time. Therefore, a complicated control for filling of the gas into the pressure accumulator by the gas-filling apparatus can be avoided. In addition, the compression filling operation by use of the compression of the first compressor is conducted after the differential pressure filling operation by use of the difference between the pressure of the gas in the storage portion and the pressure of the gas in the pressure accumulator is conducted; therefore, the gas with a pressure corresponding approximately to or greater than the pressure of the gas in the storage portion can be supplied to the pressure accumulator while the first compressor is simply controlled. Furthermore, the gas stored in the storage portion is compressed by the first compressor; thereby, a range of pressure increase of the gas in the first compressor can be reduced. Therefore, the first compressor can be downsized. That is, the number of compression stages of a compression chamber of the first compressor can be reduced; therefore, a smaller compressor can be adopted.

The gas-filling apparatus further includes a second compressor arranged in parallel with the first compressor in the gas flow passage. In such a case, a resupply operation in which in the differential pressure filling operation and the compression filling operation the gas sent from the gas supply source is compressed by the second compressor to be stored in the storage portion is conducted, and in the storage operation the gas supplied from the gas supply source is compressed by both the first compressor and the second compressor to be stored in the storage portion.

In such a configuration, the second compressor for compressing the gas to be introduced into the storage portion and the first compressor for compressing the gas discharged from the storage portion are provided. Therefore, the gas can be supplied from the gas supply source to the storage portion while the gas of the storage portion is being filled into the pressure accumulator. Consequently, even in a case where the capacity of the storage portion is large or the fill volume of the gas requested from the pressure accumulator is large, the gas-filling apparatus can continuously operate.

The gas-filling apparatus further includes an operation control portion being provided with a first pressure detector for detecting the pressure of the gas in the storage portion or a pressure corresponding to the pressure of the gas in the storage portion and a second pressure detector for detecting the pressure of the gas at the outflow end or the pressure corresponding to the pressure of the gas at the outflow end. In such a case, when a pressure difference obtained from a detection value of the second pressure detector and a detection value of the first pressure detector is equal to or smaller than a preliminary set predetermine value, the operation control portion shifts the differential pressure filling operation to the compression filling operation in a state where the number of rotations of the first compressor is increased.

In such a configuration, in the event that the pressure difference obtained from the detection value of the second pressure detector for detecting the pressure of the gas at the outflow end and the detection value of the first pressure detector for detecting the pressure of the gas in the storage portion is equal to or smaller than a predetermined value, the number of rotations of the first compressor is increased; thereby, a pressure (a flow rate) of the gas discharged from the first compressor is slightly increased. Accordingly, with regard to the supply of the gas to the pressure accumulator, for example, a relation between the fill time and a target pressure (or a target flow rate) may be defined. Even in this case, a pressure (or an amount) of the gas supplied to the pressure accumulator can be prevented from falling against the target pressure (or the target flow rate) at the time of transition from the differential pressure filling operation to the compression filling operation.

According to the present invention, a gas-filling apparatus includes a gas flow passage including an inflow end to which a gas supply source is connectable and an outflow end to which a pressure accumulator is connectable, a compressor connected to the gas flow passage, a storage portion connected to the gas flow passage, and an operation control portion which can execute a control for conducting a storage operation in which the gas from the gas supply source connected to the inflow end is supplied to the storage portion to be stored in the storage portion and a differential pressure filing operation in which the gas stored in the storage portion is discharged from the outflow end by a difference between a pressure of the gas in the storage portion and a pressure of the gas in the pressure accumulator or a pressure corresponding to the pressure of the gas in the pressure accumulator, the operation control portion being configured to execute a control in the storage operation for conducting a first storage operation in which the gas from the gas supply source is stored through the compressor to the storage portion and a second storage operation in which the gas stored in the storage portion by the first storage operation is sent to the compressor and is compressed by the compressor to be stored in the storage portion.

In such a configuration, the storage operation is divided into the first and second storage operations. Therefore, firstly, the pressure of the gas in the storage portion is increased to a first predetermined pressure in the first storage operation; thereafter, the pressure of the gas in the storage portion can be increased from the first predetermined pressure to a second predetermined pressure by the second storage operation. As a result, in comparison to a configuration in which the pressure of the gas in the storage portion is directly increased to the predetermine pressure (corresponding to the second predetermined pressure), a range of pressure increase of the gas in the compressor can be reduced. In addition, the gas is filled into the pressure accumulator by the differential pressure filling operation; therefore, a complicated control for filling of the gas into the pressure accumulator by the gas-filling apparatus can be avoided.

Here, the storage portion includes a first tank portion and a second tank portion. In such a case, the operation control portion is configured to execute a control for the second storage operation in which the gas stored in the first tank portion is compressed by the compressor to be stored in the second tank portion.

In such a configuration, in the event that the gas stored in the storage portion is compressed by the compressor and the compressed gas is returned to the storage portion, the compressed gas can be effectively stored in the storage portion.

According to the present invention, a method for filling gas, the method to supply the gas to a pressure accumulator connected to an outflow end of a gas flow passage to which a compressor and a storage portion are connected, the method including the steps of: a first compression filling operation in which the gas supplied from a gas supply source connected to an inflow end of the gas flow passage is compressed by the compressor to be discharged from the outflow end, and a second compression filling operation which is conducted after the step of conducting the first compression filling operation and in which the gas stored in the storage portion is compressed by the compressor to be discharged from the outflow end.

In the step of conducting the second compression filling operation, in a case where a ratio of a pressure of the gas at the outflow end relative to a pressure of the gas in the storage portion is equal to or greater than a storing start threshold, or the pressure of the gas in the storage portion is equal to or less than a storing start threshold, preliminarily set for each of the ratio and the pressure of the gas in the storage portion, the storage operation for storing the gas in the storage portion is conducted on the basis of either the ratio or the pressure of the gas in the storage portion.

According to the present invention, a method for filling gas, the method to supply the gas to a pressure accumulator connected to an outflow end of a gas flow passage to which a compressor and a storage portion are connected, the method including the steps of: a differential pressure filling operation in which the gas stored in the storage portion is discharged from the outflow end by a difference between a pressure of the gas in the storage portion and a pressure of the gas in the pressure accumulator or a pressure corresponding to the pressure of the gas in the pressure accumulator, and a compression filling operation which is conducted after the step of conducting the differential pressure filling operation and in which the gas stored in the storage portion is compressed by the compressor to be discharged from the outflow end.

When a pressure difference obtained from a detection value detected by a second pressure detector for detecting a pressure of the gas at the outflow end or a pressure corresponding to the pressure of the gas at the outflow end and a detection value detected by a first pressure detector for detecting the pressure of the gas in the storage portion or the pressure corresponding to the pressure of the gas in the storage portion is equal to or smaller than a preliminarily set predetermined value, the differential pressure filling operation shifts to the step of conducting the compression filling operation while the number of rotations of the compressor is increased.

The method for filling gas further includes a step of a storage operation in which the gas from the gas supply source connected to the inflow end of the gas flow passage is supplied to the storage portion to be stored in the storage portion.

According to the present invention, a method for filling gas, the method to supply the gas to a pressure accumulator connected to an outflow end of a gas flow passage to which a compressor and a storage portion are connected, the method including the steps of: a storage operation in which the gas from the gas supply source connected to the inflow end of the gas flow passage is supplied to the storage portion to be stored in the storage portion, and a differential pressure filling operation in which the gas stored in the storage portion is discharged from the outflow end by a difference of a pressure of the gas in the storage portion and a pressure of the gas in the pressure accumulator or a pressure corresponding to the pressure of the gas in the pressure accumulator, wherein the step of conducting the storage operation includes steps of a first storage operation in which the gas is supplied from the gas supply source through the compressor to be stored in the storage portion and a second storage operation in which the gas stored in the storage portion by the first storage operation is sent to the compressor and is compressed by the compressor to be stored in the storage portion.

As described above, according to the present invention, a complicated control for filling of the gas into the pressure accumulator by the gas-filling apparatus can be avoided.

DESCRIPTION OF THE PREFERRED EMBODIMENTS

Preferred embodiments of the present invention will be hereinafter described in detail with reference to the drawings.

First Embodiment

Figure 1:
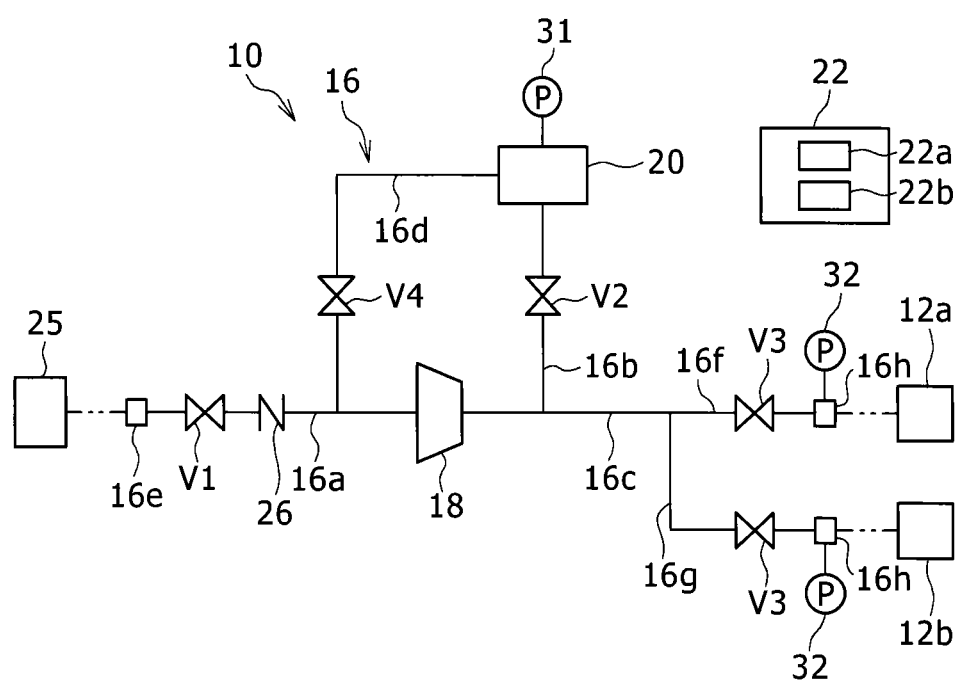
FIG. 1 is a view schematically illustrating an entire configuration of a gas-filling apparatus according to a first embodiment of the present invention.

As illustrated in FIG. 1, a gas-filling apparatus 10 according to a first embodiment of the present invention serves to fill hydrogen gas (gas) into pressure accumulators 12a, 12b arranged at a hydrogen station, for example, serving as a hydrogen gas filling stand. The hydrogen gas having a preliminarily set predetermined pressure is stored in the pressure accumulators 12a, 12b. A dispenser not shown is connected to the pressure accumulators 12a, 12b and the hydrogen gas stored in the pressure accumulators 12a, 12b is supplied through the dispenser to a fuel-cell vehicle corresponding to a tank mounting unit.

The gas-filling apparatus 10 is provided with a gas flow passage 16 for distributing the hydrogen gas, a compressor 18 connected to the gas flow passage 16, a storage portion 20 connected to the gas flow passage 16, and a controller 22. The storage portion 20 is configured by a single container or plural containers.

The gas flow passage 16 includes a first flow passage 16a, a second flow passage 16b, a third flow passage 16c, and a fourth flow passage 16d.

An inflow end 16e to which a gas supply source 25 is connectable is arranged at an upstream end of the first flow passage 16a. A downstream end of the first flow passage 16a is connected to a suction portion of the compressor 18. That is, the first flow passage 16a connects the inflow end 16e to the suction portion of the compressor 18. A first on-off valve V1 and a check valve 26 are arranged in the first flow passage 16a. The check valve 26 allows a flow only in the direction from the inflow end 16e to the suction portion of the compressor 18 (or to the storage portion 20).

One end of the second flow passage 16b is connected to a discharge portion of the compressor 18 while the other end of the second flow passage 16b is connected to the storage portion 20. That is, the second flow passage 16b connects the discharge portion of the compressor 18 to the storage portion 20. A second on-off valve V2 is arranged in the second flow passage 16b. In addition, a check valve or the like may be arranged in the second flow passage 16b in order to prevent a reversed flow of the hydrogen gas. Likewise, a check valve or the like may be arranged in the third flow passage 16c and the fourth flow passage 16d, and likewise in each flow passage in another embodiment of the present invention.

One end of the third flow passage 16c is connected to a portion at an upstream side of the second on-off valve V2 in the second flow passage 16b. The third flow passage 16c is divided in its midstream into plural branch flow passages 16f, 16g serving as first and second branch flow passages (two portions in FIG. 1). An outflow end 16h to which each of the pressure accumulators 12a, 12b is connectable is arranged at a downstream end of each of the branch flow passages 16f, 16g. That is, the outflow end 16h to which each of the pressure accumulators 12a, 12b is connectable is arranged at the other end of the third flow passage 16c. Third on-off valves V3 are arranged at the branch flow passages 16f, 16g, respectively.

In addition, the third flow passage 16c is not limited to such configuration as to be divided in the midstream into plural branches. Alternatively, the third flow passage 16c may be configured to extend without being divided into the branches and to be provided with the single outflow end 16h. In this case, the third flow passage 16c is configured to be provided with the single third on-off valve V3.

The hydrogen gas, for example, of 90 MPa is stored in each of the pressure accumulators 12a, 12b. In addition, each pressure accumulator 12a, 12b may be configured so as to store the hydrogen gas of a different pressure level.

One end of the fourth flow passage 16d is connected to the storage portion 20 while the other end of the fourth flow passage 16d is connected to a portion between the first on-off valve V1 (or the inflow end 16e) and the suction portion of the compressor 18 in the first flow passage 16a. That is, the fourth flow passage 16d connects the storage portion 20 and the suction portion of the compressor 18 so that the storage portion 20 and the suction portion of the compressor 18 are communicated with each other. A fourth on-off valve V4 is arranged in the fourth flow passage 16d. The first through fourth on-off valves V1-V4 are flow control elements associated with the gas flow passage 16 for controlling a gas flow in the gas flow passage.

The gas supply source 25 is, for example, a gas canister filled with hydrogen gas, a hydrogen gas manufacturing system, a gas pipe distributing hydrogen gas, or the like. The hydrogen gas, for example, of 1 MPa or lower is supplied from the gas supply source 25.

The compressor 18 is configured by a reciprocating compressor which rotate a crankshaft (not shown) driven by a motor (not shown), thereby reciprocating a piston. In addition, the compressor 18 is not limited to the reciprocating compressor and may be configured by a different type of a compressor from the reciprocating compressor.

A signal outputted from a first sensor (a first pressure detector) 31 for detecting a pressure of the hydrogen gas in the storage portion 20 and a signal outputted from a second sensor (a second pressure detector) 32 for detecting a pressure of the hydrogen gas at the outflow end 16h are inputted into the controller 22.

A program which executes an operation control for the gas-filling apparatus 10 is stored in the controller 22 and the controller 22 executes the program to exert a predetermined function. At least an operation control portion 22a and an operation shift control portion 22b are included in the function of the controller 22.

The operation control portion 22a executes a control for conducting a storage operation in which the hydrogen gas is supplied from the gas supply source 25 to the storage portion 20 to be stored therein. The storage operation is an operation in which the hydrogen gas introduced from the gas supply source 25 is compressed by the compressor 18 and the compressed gas is stored in the storage portion 20. During the storage operation, the first on-off valve V1 and the second on-off valve V2 are opened while the third on-off valves V3 and the fourth on-off valve V4 are closed.

In addition, the operation control portion 22a executes a control for conducting a filling operation in which the hydrogen gas is compressed by the compressor 18 to be supplied to the pressure accumulators 12a, 12b. The filling operation includes a case where the hydrogen gas is supplied only to a portion of the pressure accumulators 12a, 12b and a case where the hydrogen gas is supplied to all of the pressure accumulators 12a, 12b. In the case of supplying the hydrogen gas only to a portion of the pressure accumulators 12a, 12b, one of the third on-off valves V3 is opened while the other one of the third on-off valves V3 is closed. In the case of supplying the hydrogen gas to all of the pressure accumulators 12a, 12b, all of the third on-off valves V3 are opened and likewise in a third embodiment of the present invention which is described below.

The filling operation includes first and second compression filling operations. The first compression filling operation is an operation in which the hydrogen gas supplied from the gas supply source 25 connected to the inflow end 16e is compressed by the compressor 18 to be discharged from the outflow end 16h. During the first compression filling operation, the first on-off valve V1 is opened while the second on-off valve V2 and the fourth on-off valve V4 are closed. The second compression filling operation is an operation in which the hydrogen gas stored in the storage portion 20 is compressed by the compressor 18 to be discharged from the outflow end 16h. During the second compression filling operation, the fourth on-off valve V4 is opened while the first on-off valve V1 and the second on-off valve V2 are closed.

The operation shift control portion 22b commands the operation control portion 22a to shift the first compression filling operation to the second compression filling operation. In particular, the operation shift control portion 22b detects detection values detected by the first sensor 31 and the second sensor 32 and commands the operation control portion 22a to shift the first compression filling operation to the second compression filling operation when the detection value detected by the second sensor 32 is equal to or greater than a preliminarily set predetermined value. The predetermined value is set to, for example, about from 25 MPa to 45 MPa (for example, 45 MPa in FIG. 2). The operation control portion 22a receives a command from the operation shift control portion 22b to execute a control for shifting the first compression filling operation to the second compression filling operation.

In addition, in a case where a ratio of the pressure of the hydrogen gas at the outflow end 16h to the pressure of the hydrogen gas in the storage portion 20 has reached a value equal to or greater than a preliminarily set value in the second compression filling operation, the operation shift control portion 22b commands the operation control portion 22a to stop the second compression filling operation to shift the second compression filling operation to the storage operation. In particular, in a case where P2/P1 which is a ratio of a detection value P2 of the second sensor 32 relative to a detection value P1 of the first sensor 31 has reached a value equal to or greater than a compression ratio limit Pr during the second compression filling operation, the operation shift control portion 22b commands the operation control portion 22a to shift the second compression filling operation to the storage operation. The compression ratio limit Pr is a limit value of a compression ratio which is set when the compressor 18 is designed, and it is set on the basis of a compression ratio which is allowable when the hydrogen gas is compressed to a target pressure (for example, about 90 MPa). Therefore, in a case where the pressure of the hydrogen gas in the storage portion 20 can be compressed by the compressor 18 to the target pressure within the compression ratio limit Pr, the second compression filling operation is conducted. On the other hand, for example, the pressure of the hydrogen gas in the storage portion 20 is even compressed by the compressor 18 but is decreased to such an extent that the pressure of the hydrogen gas in the storage portion 20 is below the compression ratio limit Pr and cannot reach the target pressure. In this case, the operation shift control portion 22b commands the operation control portion 22a to shift the second compression filling operation to the storage operation. Thus, when the operation control portion 22a receives such command from the operation shift control portion 22b, the operation control portion 22a stops the second compression filling operation to execute the storage operation for storing the hydrogen gas supplied from the gas supply source 25 in the storage portion 20.

Here, an operation control of the gas-filling apparatus 10 according to the first embodiment is described. The gas-filling apparatus 10 operates as follows; thereby, a method for filling gas to fill the pressure accumulators 12a, 12b with the hydrogen gas is implemented (the method will be hereinafter referred to as a gas filling method).

Figure 2:
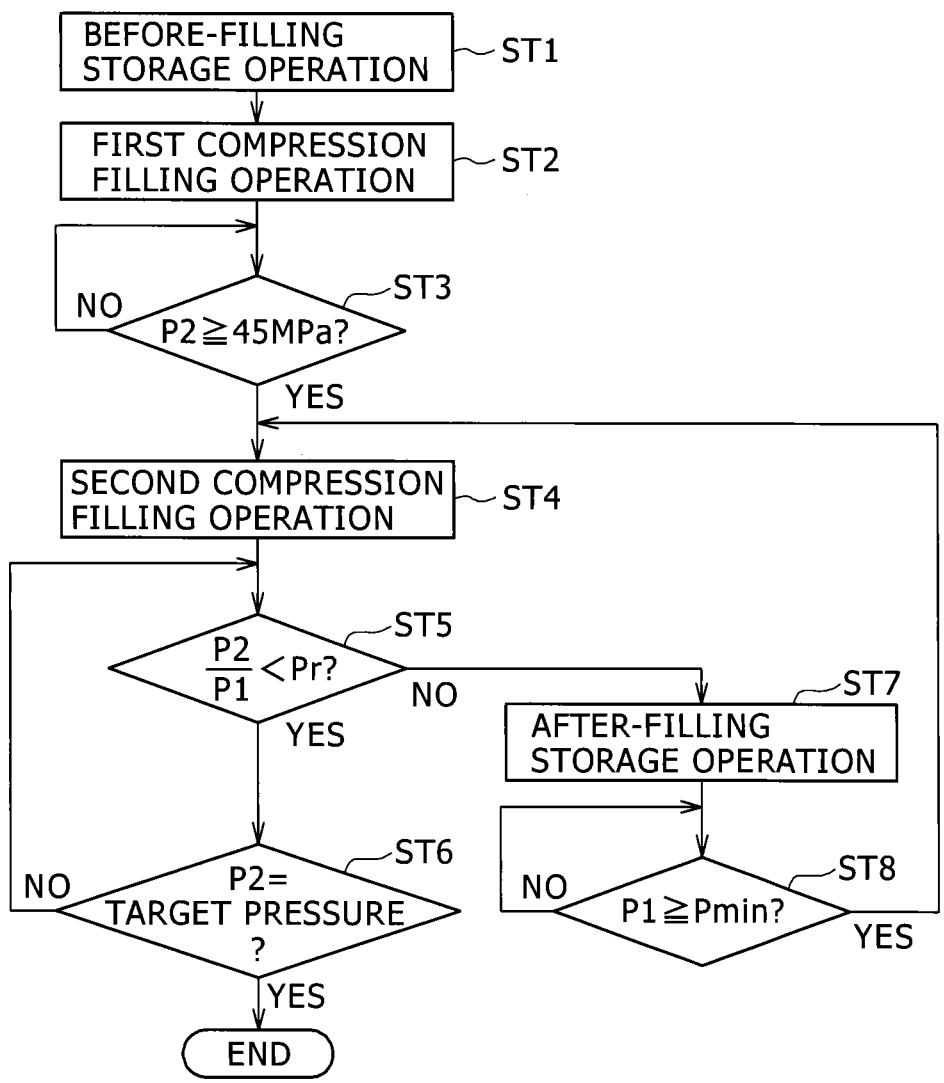
FIG. 2 is a flow diagram describing a method for filling gas by the gas-filling apparatus according to the first embodiment of the present invention.

As illustrated in FIG. 2, the gas filling method includes a step (steps ST1 and ST7) for conducting the storage operation, a step (step ST2) for conducting the first compression filling operation, and a step (step ST4) for conducting the second compression filling operation. The storage operation includes a before-filling storage operation (step ST1) in which the hydrogen gas is supplied to the storage portion 20 before the gas-filling apparatus 10 starts an operation for supplying the hydrogen gas to the pressure accumulators 12a, 12b, and an after-filling storage operation (step ST7) in which the supply of the hydrogen gas to the pressure accumulators 12a, 12b is started and thereafter it is temporarily stopped and then the hydrogen gas is supplied to the storage portion 20.

In the before-filling storage operation of step ST1, the first on-off valve V1 and the second on-off valve V2 are opened while the third on-off valves V3 and the fourth on-off valve V4 are closed, and the compressor 18 is driven. In addition, the hydrogen gas introduced into the gas flow passage 16 from the gas supply source 25 connected to the inflow end 16e of the first flow passage 16a is suctioned from the first flow passage 16a into the compressor 18 and is compressed and boosted by the compressor 18. The hydrogen gas compressed by the compressor 18 is introduced through the second flow passage 16b into the storage portion 20. When the pressure (the detection value P1) detected by the first sensor 31 has reached a preliminarily set predetermined value (for example, 45 MPa), the before-filling storage operation finishes.

When a gas supply command from the dispenser is received, the first compression filling operation (step ST2) for supplying the hydrogen gas to the pressure accumulators 12a, 12b is started. In the first compression filling operation, the hydrogen gas may be supplied to one of the pressure accumulators 12a, 12b or both of the pressure accumulators 12a, 12b in response to the gas supply command. Here, a case of supplying the hydrogen gas to the first pressure accumulator 12a is described. In the first compression filling operation of this case, the third on-off valve V3 arranged in the first branch flow passage 16f to which the first pressure accumulator 12a is connected is opened while the third on-off valve V3 arranged in the second branch flow passage 16g to which the second pressure accumulator 12b is connected is closed.

In the first compression filling operation, the compressor 18 is driven. Further, in the first compression filling operation, the first on-off valve V1 is opened while the fourth on-off valve V4 and the second on-off valve V2 are closed. Therefore, the hydrogen gas introduced from the gas supply source 25 into the gas flow passage 16 is suctioned through the first flow passage 16a into the compressor 18. The hydrogen gas compressed in the compressor 18 is discharged from the outflow end 16h of the third flow passage 16c to be filled in the first pressure accumulator 12a.

In the first compression filling operation, the pressure of the hydrogen gas at the outflow end 16h is monitored by the second sensor 32 (step ST3). In addition, it is determined in step ST3 whether the pressure of the hydrogen gas at the outflow end 16h (the detection value P2 of the second sensor 32) has reached the preliminarily set predetermined value (for example, 45 MPa in FIG. 2). When the pressure of the hydrogen gas at the outflow end 16*h* has reached the predetermined value, the first compression filling operation shifts to the second compression filling operation (step ST3 shifts to step ST4). In addition, a value equal to or greater than a lower limit Pmin is desirably adopted as the predetermined value. The lower limit Pmin is a value obtained by dividing the target pressure by the compression ratio limit Pr.

In the second compression filling operation as in the first compression filling operation, the third on-off valve V3 arranged in the first branch flow passage 16*f* to which the first pressure accumulator 12*a* is connected is opened while the third on-off valve V3 arranged in the second branch flow passage 16*g* to which the second pressure accumulator 12*b* is connected is closed. Further, in the second compression filling operation, the fourth on-off valve V4 is opened while the first on-off valve V1 and the second on-off valve V2 are closed. Therefore, the hydrogen gas suctioned from the storage portion 20 through the fourth flow passage 16*d* and the first flow passage 16*a* into the compressor 18 is compressed by the compressor 18. This hydrogen gas is discharged from the compressor 18 to be filled through the third flow passage 16*c* into the first pressure accumulator 12*a*.

In the second compression filling operation, the pressure of the hydrogen gas in the storage portion 20 is detected by the first sensor 31 and the pressure of the hydrogen gas at the outflow end 16*h* is detected by the second sensor 32. In addition, it is determined in step ST5 whether the ratio P2/P1 of the detection value P2 of the second sensor 32 (corresponding to a pressure at the discharge portion of the compressor 18) relative to the detection value P1 of the first sensor 31 (corresponding to a pressure at the suction portion of the compressor 18) is smaller than a storing start threshold (the compression ratio limit Pr in the first embodiment). When the ratio P2/P1 is smaller than the storing start threshold, step ST5 shifts to step ST6.

In step ST6, the pressure of the hydrogen gas at the outflow end 16*h* is monitored by the second sensor 32. When the detection value P2 of the second sensor 32 has reached the predetermined value corresponding to the target pressure (for example, 90 MPa in FIG. 2), the second compression filling operation finishes.

In the aforementioned step ST5, when the ratio P2/P1 of the detection value P2 of the second sensor 32 relative to the detection value P1 of the first sensor 31 is equal to or greater than the storing start threshold, step ST5 shifts to step ST7. In step ST7, the second compression filling operation is stopped and the after-filling storage operation is conducted. The after-filling storage operation of step ST7 is similar to the before-filling storage operation of step ST1. The after-filling storage operation is an operation in which the hydrogen gas introduced from the gas supply source 25 connected to the inflow end 16*e* of the first flow passage 16*a* is compressed by the compressor 18 to be stored in the storage portion 20. In the after-filling storage operation, the pressure of the hydrogen gas in the storage portion 20 is detected and it is determined in step ST8 whether the detection value P1 of the first sensor 31 has reached the lower limit Pmin (for example, 45 MPa in FIG. 2) corresponding to the preliminarily set predetermined value. When the detection value P1 has reached a value equal to or greater than the lower limit Pmin in step ST8, the after-filling storage operation finishes and the second compression filling operation is thereafter restarted (step ST8 shifts to step ST4). Thus, the second compression filling operation is conducted until the pressure of the hydrogen gas at the outflow end 16*h* reaches the target pressure.

As described above, in the first embodiment, the first compression filling operation is conducted and is thereafter shifted to the second compression filling operation. That is, in the event of supplying the hydrogen gas to the pressure accumulators 12*a*, 12*b*, the supply of the hydrogen gas from the gas supply source 25 and the supply of the hydrogen gas from the storage portion 20 are not conducted at the same time. Therefore, a complicated control for filling of the hydrogen gas into the pressure accumulators 12*a*, 12*b* by the gas-filling apparatus 10 can be avoided. In addition, the first compression filling operation is conducted until the pressure of the hydrogen gas at the outflow end 16*h* reaches a predetermined pressure. Thereafter, the first compression filling operation is shifted to the second compression filling operation; therefore, a range of pressure increase of the hydrogen gas in the compressor 18 can be reduced. As a result, the compressor 18 may be downsized. That is, the number of compression stages of a compression chamber of the compressor 18 can be reduced; therefore, a smaller compressor can be adopted.

Second Embodiment

Next, a second embodiment of the present invention will be described. In addition, same reference numbers are assigned to components in the second embodiment, which are similar to those in the first embodiment, and those details will not be explained herein.

Figure 3:
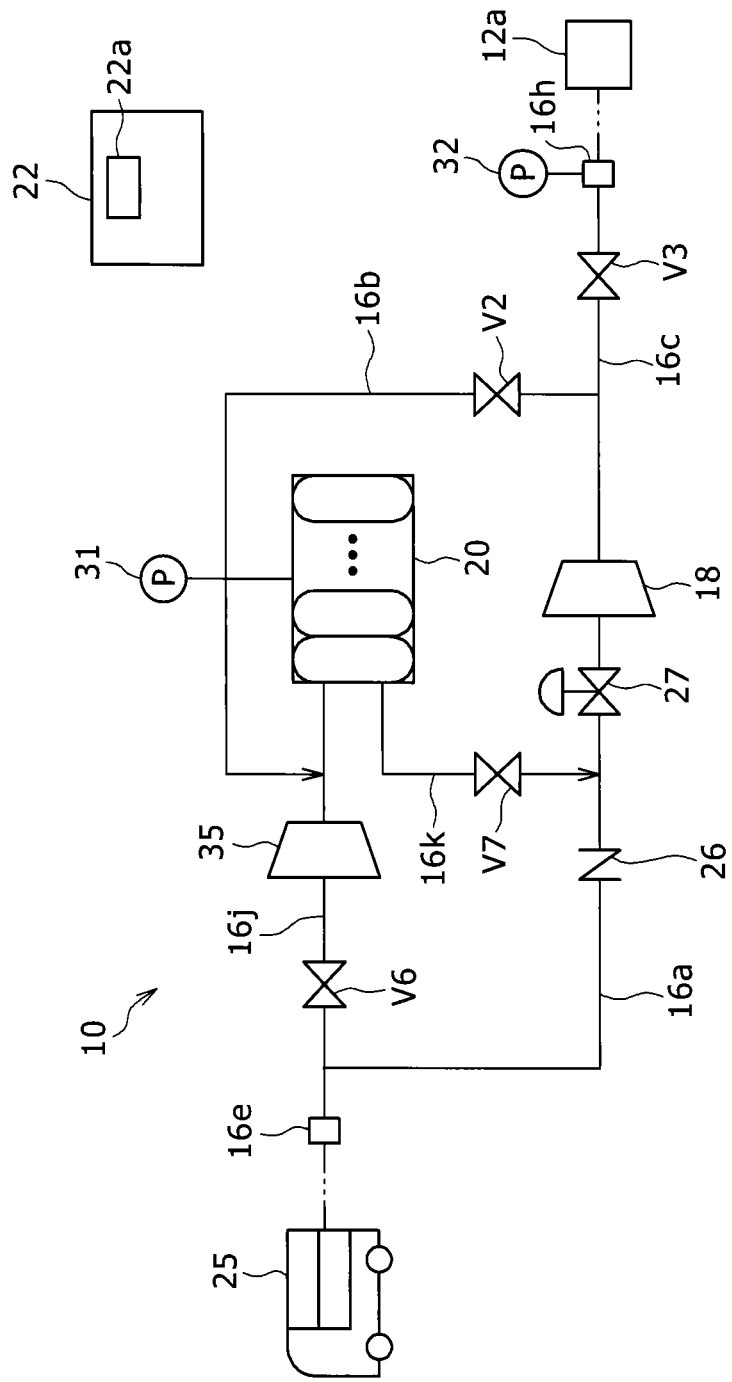
FIG. 3 is a view schematically illustrating an entire configuration of the gas-filling apparatus according to a second embodiment of the present invention.

As illustrated in FIG. 3, the gas-filling apparatus 10 according to the second embodiment is provided with the gas flow passage 16. The gas flow passage 16 includes the first flow passage 16*a*, the second flow passage 16*b*, the third flow passage 16*c*, a sixth flow passage 16*j*, and a seventh flow passage 16*k*.

The inflow end 16*e* to which the gas supply source 25 is connectable is arranged at the upstream end of the first flow passage 16*a*. The downstream end of the first flow passage 16*a* is connected to the suction portion of the compressor 18. The check valve 26 and a flow regulating valve 27 are arranged in the first flow passage 16*a*. The flow regulating valve 27 is configured by an electric-operated valve, an opening degree of which is regulatable. In addition, in the second embodiment, the first on-off valve V1 is omitted. Furthermore, in the second embodiment, the operation shift control portion 22*b* of the controller 22 is omitted.

One end of the seventh flow passage 16*k* is connected to an outflow portion of the storage portion 20 while the other end of the seventh flow passage 16*k* is connected to a portion between the inflow end 16*e* (or the check valve 26) and the suction portion of the compressor 18 in the first flow passage 16*a*. Therefore, the hydrogen gas discharged from the storage portion 20 flows through the seventh flow passage 16*k*, thereafter passing through the first flow passage 16*a* to be introduced into the compressor 18. A seventh on-off valve V7 is arranged in the seventh flow passage 16*k*.

One end of the sixth flow passage 16*j* is connected to the inflow end 16*e* in the first flow passage 16*a* while the other end of the sixth flow passage 16*j* is connected to an inflow portion of the storage portion 20.

A compressor 35 different from the compressor 18 is arranged in the sixth flow passage 16*j*. The compressor 35 discharges the hydrogen gas at lower discharge pressure than the compressor 18. Hereinafter, the compressor 18 and the compressor 35 will be referred to as a first compressor 18 and a second compressor 35, respectively. The first compressor 18 and the second compressor 35 are arranged in parallel with each other in a pathway connecting the inflow end 16e of the gas flow passage 16 and the storage portion 20 (that is, in the first flow passage 16a, the second flow passage 16b, and the sixth flow passage 16j).

A throttle valve V6 is arranged at an upstream side from the second compressor 35 in the sixth flow passage 16j. In a case where the pressure of the hydrogen gas supplied from the gas supply source 25 is higher than a predetermined value, the throttle valve V6 serves to reduce the pressure before the hydrogen gas is suctioned into the second compressor 35.

One end of the second flow passage 16b is connected to the discharge portion of the first compressor 18 while the other end of the second flow passage 16b is connected to a portion at a downstream side of the second compressor 35 in the sixth flow passage 16j. In addition, the other end of the second flow passage 16b may be directly connected to the storage portion 20.

One end of the third flow passage 16c is connected to a portion at an upstream side from the second on-off valve V2 in the second flow passage 16b. The outflow end 16h to which the pressure accumulator 12a is connectable is arranged at the other end of the third flow passage 16c. In addition, in FIG. 3, the third flow passage 16c is configured to be connected to the single pressure accumulator 12a; however, it may be configured to be connected to plural pressure accumulators in the same way as in the first embodiment. In this case, the third flow passage 16c is configured to be divided in its midstream into plural flow passages.

The storage portion 20 includes plural containers; therefore, the hydrogen gas introduced into the storage portion 20 is stored sequentially in the respective containers.

The operation control portion 22a can execute a control for conducting a storage operation to store the hydrogen gas in the storage portion 20 and a filling operation to fill the pressure accumulator 12a with the hydrogen gas.

In the storage operation, the hydrogen gas introduced from the gas supply source 25 is compressed by both the first compressor 18 and the second compressor 35 to be stored in the storage portion 20. In particular, the second compressor 35 is used to compress the hydrogen gas which is exclusively supplied to the storage portion 20. The pressure of the hydrogen gas supplied from the gas supply source 25 is, for example, from 20 MPa to 40 MPa.

The filling operation includes an operation to fill the pressure accumulator 12a with the hydrogen gas of the storage portion 20 by a difference between the pressure of the hydrogen gas stored in the storage portion 20 and the pressure of the hydrogen gas in the pressure accumulator 12a, and an operation to compress the hydrogen gas stored in the storage portion 20 by the first compressor 18 and fill the pressure accumulator 12a with the compressed hydrogen gas. Hereinafter, in order to distinguish these two filling operations from each other, the filling operation by use of the difference between the pressure in the storage portion 20 and the pressure in the pressure accumulator 12a will be referred to as a differential pressure filling operation and the filling operation by use of the compression of the hydrogen gas by the first compressor 18 will be referred to as a compression filling operation.

In any of the differential pressure filling operation and the compression filling operation, the seventh on-off valve V7 and the third on-off valve V3 are opened while the second on-off valve V2 is closed. That is, although the hydrogen gas discharged from the storage portion 20 passes through the first compressor 18 in any of the differential pressure filling operation and the compression filling operation, the hydrogen gas is not substantially compressed in the first compressor 18 in the differential pressure filling operation while the hydrogen gas is compressed by the first compressor 18 in the compression filling operation. In addition, during the differential pressure filling operation, the first compressor 18 is being driven, but it is operated under a state where the pressure at the suction portion is higher than the pressure at the discharge portion. Therefore, the first compressor 18 is in operation under a state where the hydrogen gas is not substantially compressed.

Here, an operation control for the gas-filling apparatus 10 according to the second embodiment is described. The gas-filling apparatus 10 operates as follows; thereby, a method for filling gas (i.e., the gas filling method) to fill the pressure accumulator 12a with the hydrogen gas is implemented.

Figure 4:
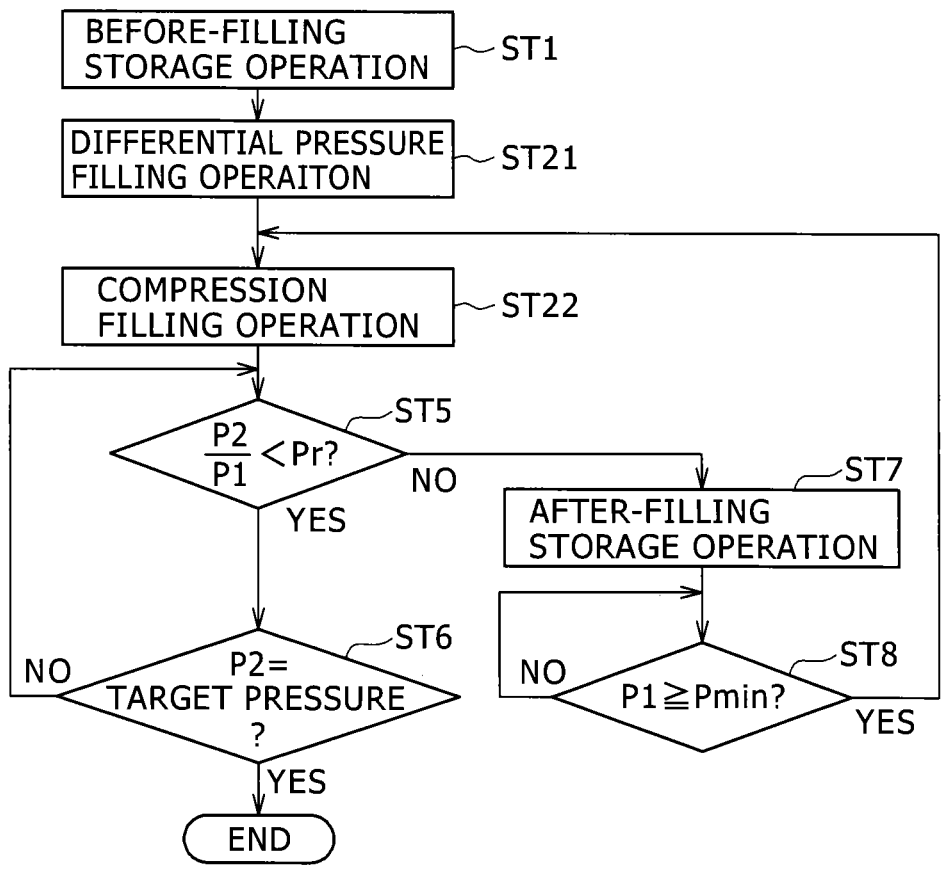
FIG. 4 is a flow diagram describing storing, differential pressure filling, and compression filling operations by the gas-filling apparatus according to the second embodiment of the present invention.

As illustrated in FIG. 4, the gas filling method of the second embodiment is similar to that in FIG. 2 except for steps ST2 to ST4 of FIG. 2. In addition as illustrated in FIG. 5, a step for conducting a resupply operation (step ST24) is included in the second embodiment.

First, in the before-filling storage operation of step ST1, the hydrogen gas introduced from the gas supply source 25 to the sixth flow passage 16j is regulated by the throttle valve V6 to be suctioned into the second compressor 35 and compressed thereby, thereafter being introduced into the storage portion 20. At the same time, the hydrogen gas introduced into the first flow passage 16a is compressed by the first compressor 18 to be introduced through the second flow passage 16b into the storage portion 20. In addition, the third on-off valve V3 and the seventh on-off valve V7 are closed. During the storage operation, the pressure of the hydrogen gas in the storage portion 20 is detected by the first sensor 31. When the pressure detected by the first sensor 31 has reached a preliminarily set first predetermined pressure (for example, 45 MPa), the before-filling storage operation finishes.

Thereafter, when the gas supply command from the dispenser is received, the differential pressure filling operation is started (step ST21). In the differential pressure filling operation, the third on-off valve V3 and the seventh on-off valve V7 are opened while the second on-off valve V2 is closed. In the first compressor 18, inlet and discharge valves of a cylinder (not shown) are opened and the hydrogen gas in the first flow passage 16a is filled into the pressure accumulator 12a without being substantially compressed. In the differential pressure filling operation, the opening degree of the flow regulating valve 27 is regulated. In addition, the first compressor 18 is practically being driven at a predetermined speed in the differential pressure filling operation.

Figure 5:
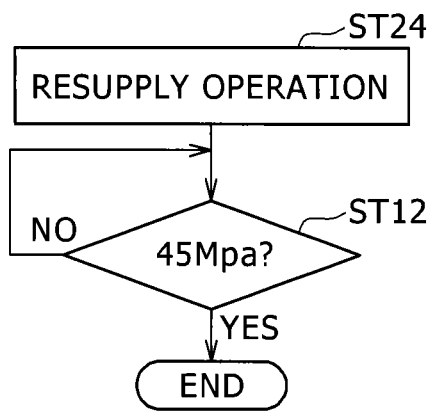
FIG. 5 is a flow diagram illustrating a resupply operation by the gas-filling apparatus according to the second embodiment of the present invention.

Meanwhile, in conjunction with the above-mentioned differential pressure filling operation, the resupply operation in which the hydrogen gas supplied from the gas supply source 25 is boosted in the second compressor 35 to be filled in the storage portion 20 is conducted (step ST24 in FIG. 5). In the compression filling operation by the first compressor 18 to be described, the resupply operation is continued. In the resupply operation, it is determined in step ST12 whether the pressure P1 detected by the first sensor 31 has reached a preliminarily set predetermined pressure (for example, 45 MPa). In step ST12, when the pressure P1 has reached the predetermined pressure, the resupply operation finishes. In a case where the pressure of the hydrogen gas in the storage portion 20 is decreased, the resupply operation is conducted again.

In the gas-filling apparatus 10 of the second embodiment, the resupply operation is conducted in conjunction with the operation to fill the pressure accumulator 12a with the hydrogen gas. As a result, even in a case where the capacity of the storage portion 20 is small or in a case where the fill volume of the hydrogen gas requested from the pressure accumulator 12a is large, the volume of the hydrogen gas in the storage portion 20 is prevented from being suddenly decreased and the time for continuous run of the gas-filling apparatus 10 can be extended.

When the pressure at the discharge portion of the first compressor 18 is higher than the pressure at the suction portion of the first compressor 18, the inlet and discharge valves of the cylinder are brought into a closed state; therefore, the differential pressure filling operation shifts to the compression filling operation (step ST21 shifts to step ST22).

In the compression filling operation of step ST22, the hydrogen gas is suctioned from the storage portion 20 through the seventh flow passage 16k into the first compressor 18 to be compressed therein. The hydrogen gas discharged from the first compressor 18 is filled through the third flow passage 16c into the pressure accumulator 12a.

In the compression filling operation, the pressure of the hydrogen gas in the storage portion 20 is detected by the first sensor 31 and the pressure of the hydrogen gas at the outflow end 16h is detected by the second sensor 32. It is determined in step ST5 whether the ratio P2/P1 of the detection value P2 of the second sensor 32 relative to the detection value P1 of the first sensor 31 is smaller than the storing start threshold (the compression ratio limit Pr in the second embodiment). When the ratio P2/P1 is smaller than the storing start threshold, step ST5 shifts to step ST6.

In step ST6, when the detection value P2 of the second sensor 32 has reached a predetermined value (for example, 90 MPa in FIG. 4) corresponding to the target pressure, the compression filling operation finishes.

On the other hand, in the aforementioned step ST5, when the ratio P2/P1 is equal to or greater than the storing start threshold, step ST5 shifts to step ST7. In step ST7, the compression filling operation is stopped and the after-filling storage operation is conducted. The after-filling storage operation of step ST7 is similar to the before-filling storage operation of step ST1. In the after-filling storage operation, the hydrogen gas introduced from the gas supply source 25 is compressed in both the second compressor 35 and the first compressor 18 to be supplied to the storage portion 20. In the event that the volume of the hydrogen gas introduced into the storage portion 20 only by the resupply operation of the second compressor 35 is deficient, the hydrogen gas is introduced into the storage portion 20 from the first compressor 18 in addition to from the second compressor 35 as describe above. After step ST7, it is determined in step ST8 whether the detection value P1 of the first sensor 31 has reached the lower limit Pmin (for example, 45 MPa in FIG. 4) that is the preliminarily set first predetermined value. When the detection value P1 has reached a value equal to or greater than the lower limit Pmin, the after-filling storage operation finishes and the compression filling operation restarts (step ST8 shifts to step ST4). Thus, the compression filling operation is conducted until the pressure of the hydrogen gas at the outflow end 16h reaches the target pressure.

As described above, in the second embodiment, the hydrogen gas is supplied to the storage portion 20 by the second compressor 35 and the first compressor 18 in the storage operation. As a result, the amount of time for the storage operation can be shorten compared to the case of supplying the hydrogen gas only by the second compressor 35. In particular, a compressor, the discharge volume of which is larger than that of the second compressor 35 is applied as the first compressor 18; thereby, the amount of time for the storage operation can further shorten. In addition, in the event that a container of the storage portion 20 is empty at the time of an inspection such as an overhaul, the hydrogen gas can be promptly filled in the storage portion 20 after the inspection.

In the second embodiment, at the time of supplying the hydrogen gas to the pressure accumulator 12a, the gas supply by use of the pressure difference and the gas supply by use of the compression by the first compressor 18 are not conducted at the same time. Therefore, a complicated control for filling of the hydrogen gas into the pressure accumulator 12a by the gas-filling apparatus 10 can be avoided. In addition, according to the gas-filling apparatus 10 of the second embodiment, in comparison to the case of conducting only the compression filling operation, a range of pressure increase of the hydrogen gas in the first compressor 18 can be reduced and the first compressor 18 can be downsized.

Figure 6:
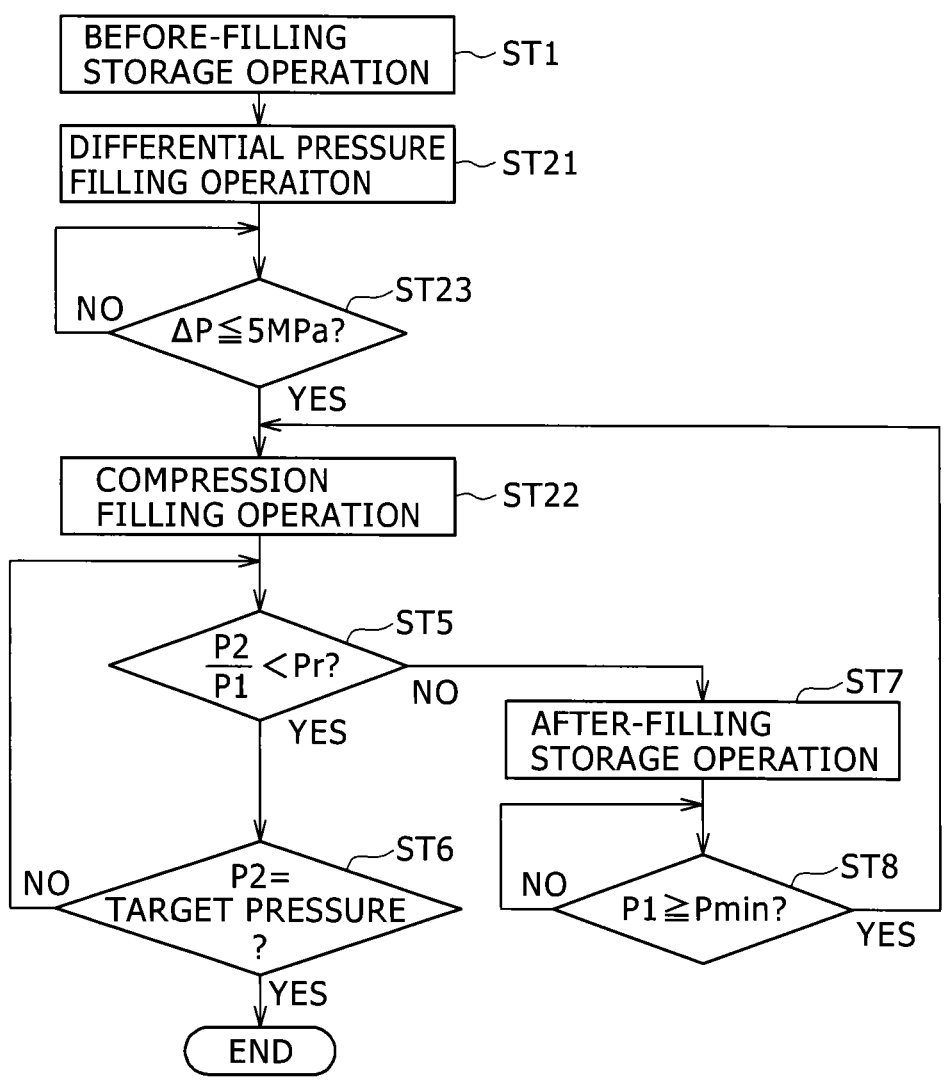
FIG. 6 is a flow diagram describing storing, differential pressure filling, and compression filling operations by the gas-filling apparatus according to a modified example of the second embodiment of the present invention.

An operation of the gas-filling apparatus 10 according to a modified example of the second embodiment is illustrated in FIG. 6. With regard to the supply of the hydrogen gas to the pressure accumulator 12a, a relation between a fill time and a target pressure (or a target flow rate) may be defined (for example, in a case where the pressure accumulator 12a is a tank of a fuel-cell vehicle). At the time of transition from the differential pressure filling operation to the compression filling operation in the case of filling the pressure accumulator 12a with the hydrogen gas, the volume of the hydrogen gas supplied from the storage portion 20 to the pressure accumulator 12a is decreased and may therefore fall below the target pressure (or the target flow rate).

In order to respond to such a situation, the pressures at the suction portion and the discharge portion of the compressor 18 are repeatedly detected by the first sensor 31 and the second sensor 32 in the gas-filling apparatus 10 during the differential pressure filling operation of step ST21. When a pressure difference ΔP obtained by subtracting a detection value of the second sensor 32 from a detection value of the first sensor 31 is equal to or smaller than a preliminarily set predetermined value (for example, 5 MPa in FIG. 6) in step ST23, the first compressor 18 is controlled so that the number of rotations thereof is increased. The number of rotations of the first compressor 18 is increased; thereby, the pressure (the flow rate) of the hydrogen gas discharged from the first compressor 18 is slightly increased. As a result, a pressure (or an amount) of the hydrogen gas supplied to the pressure accumulator 12a can be prevented from falling against the target pressure (or the target flow rate) at the time of transition from the differential pressure filling operation to the compression filling operation. In addition, when the detection value of the second sensor 32 is greater than the detection value of the first sensor 31, the hydrogen gas is compressed in the first compressor 18 under a state where the discharge and inlet valves of the first compressor 18 are closed (step ST23). Furthermore, the aforementioned control for increasing the number of rotations of the first compressor 18 can be regarded as a portion of the compression filling operation or a portion of the differential pressure filling operation.

Third Embodiment

Figure 7:
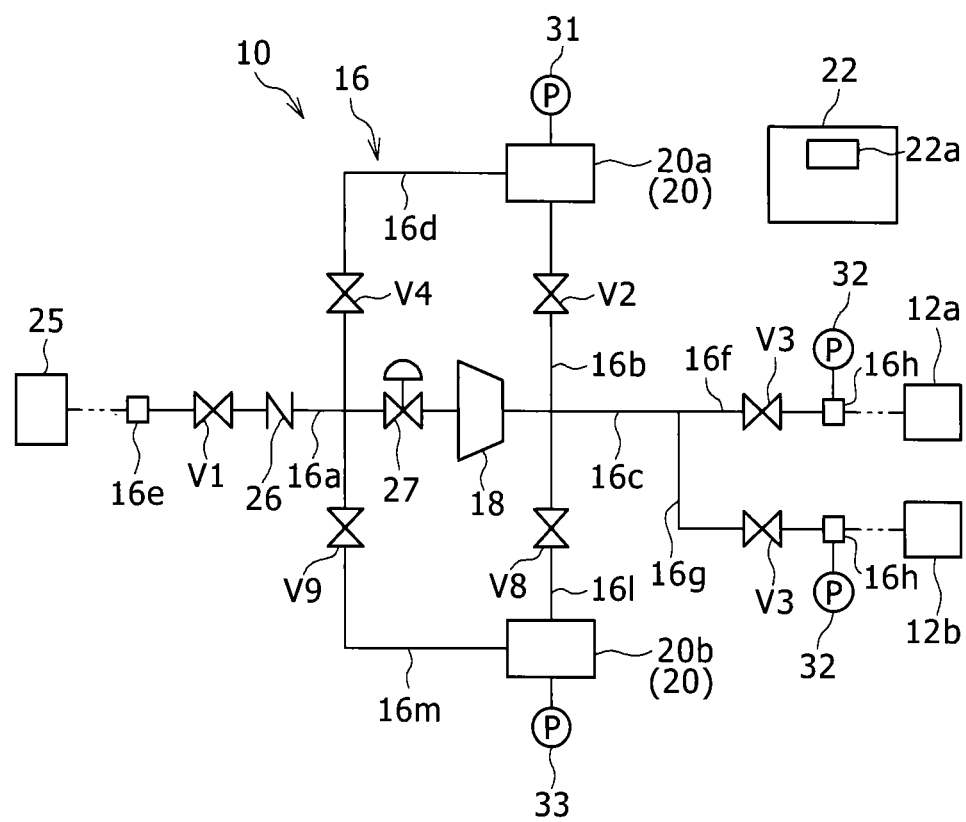
FIG. 7 is a view schematically illustrating an entire configuration of the gas-filling apparatus according to a third embodiment of the present invention.

A third embodiment of the present invention is illustrated in FIG. 7. In the third embodiment, the storage portion 20 is configured to include a first tank portion 20a and a second tank portion 20b which stores gas with higher pressure than the first tank portion 20a. In the third embodiment, the hydrogen gas is filled in the pressure accumulators 12a, 12b only by the differential pressure filling operation from the second tank portion 20b. Same reference numbers are assigned to components in the third embodiment, which are similar to those in the first embodiment, and those details will not be explained herein.

The flow regulating valve 27 is arranged in the first flow passage 16a. The flow regulating valve 27 is configured by an electric-operated valve, an opening degree of which is regulatable.

The first tank portion 20a is connected to one end of the second flow passage 16b and is connected to one end of the fourth flow passage 16d. The second tank portion 20b is connected to one end of an eighth flow passage 16l, the other end of which is connected to the other end of the second flow passage 16b. In addition, the second tank portion 20b is connected to one end of a ninth flow passage 16m, the other end of which is connected to the other end of the fourth flow passage 16d. An eighth on-off valve V8 is arranged in the eighth flow passage 16l and a ninth on-off valve V9 is arranged in the ninth flow passage 16m.

The first sensor 31 for detecting a pressure of the hydrogen gas in the first tank portion 20a is arranged at the first tank portion 20a. A third sensor 33 (serving as the first pressure detector) for detecting a pressure in the second tank portion 20b is arranged at the second tank portion 20b. The hydrogen gas, for example, of about 45 MPa is stored in the first tank portion 20a while the hydrogen gas, for example, of about 90 MPa is stored in the second tank portion 20b.

The storage operation in the third embodiment includes first and second storage operations. The first storage operation is an operation in which the hydrogen gas introduced from the gas supply source 25 is compressed by the compressor 18 to be stored in the first tank portion 20a of the storage portion 20. During the first storage operation, the first on-off valve V1 and the second on-off valve V2 are opened while the third, fourth, eighth, and ninth on-off valves V3, V4, V8, and V9 are closed. The second storage operation is an operation in which the hydrogen gas stored in the first tank portion 20a is sent to the compressor 18 and is compressed by the compressor 18 to be stored in the second tank portion 20b of the storage portion 20. During the second storage operation, the fourth on-off valve V4 and the eighth on-off valve V8 are opened while the first, second, third, and ninth on-off valves V1, V2, V3, and V9 are closed.

The differential pressure filling operation of the third embodiment is an operation in which the hydrogen gas stored in the second tank portion 20b of the storage portion 20 is supplied to the pressure accumulators 12a, 12b without being compressed by the compressor 18.

In the differential pressure filling operation, the ninth on-off valve V9 and the third on-off valves V3 are opened while the first, second, fourth, and eighth on-off valves V1, V2, V4, and V8 are closed.

Figure 8:
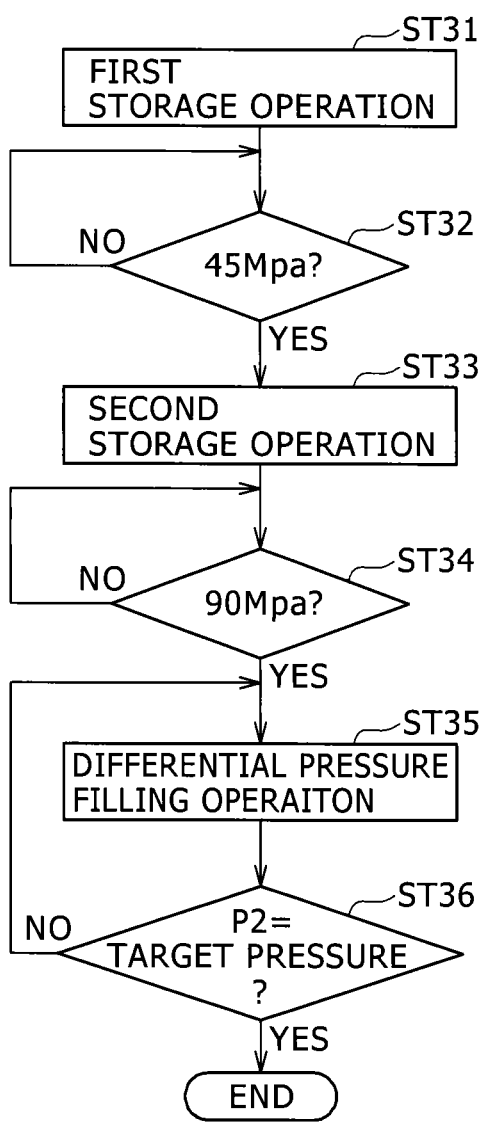
FIG. 8 is a flow diagram describing storing and differential pressure filling operations by the gas-filling apparatus according to the third embodiment of the present invention.

Here, an operation control for the gas-filling apparatus 10 according to the third embodiment will be described with reference to FIG. 8. The gas-filling apparatus 10 operates as follows; thereby, a method for filling gas (i.e., the gas filling method) to fill the pressure accumulators 12a, 12b with the hydrogen gas is implemented.

First, in the first storage operation (step ST31), the first on-off valve V1 and the second on-off valve V2 are opened while the third, fourth, eighth, and ninth on-off valves V3, V4, V8, and V9 are closed, and the compressor 18 is driven.

In addition, the hydrogen gas is supplied from the gas supply source 25 through the first flow passage 16a to the compressor 18 and is compressed therein to be introduced through the second flow passage 16b into the first tank portion 20a.

During the first storage operation, the pressure of the hydrogen gas in the first tank portion 20a is monitored by the first sensor 31 (step ST32). In step ST32, when the pressure detected by the first sensor 31 has reached the preliminarily set first predetermined pressure (for example, 45 MPa), the first storage operation shifts to the second storage operation (step ST32 shifts to step ST33).

In the second storage operation, the fourth on-off valve V4 and the eighth on-off valve V8 are opened while the first, second, third, and ninth on-off valves V1, V2, V3, and V9 are closed. The compressor 18 is driven; thereby, the hydrogen gas stored in the first tank portion 20a flows therefrom through the fourth flow passage 16d to the first flow passage 16a to be suctioned into the compressor 18. Afterward, the hydrogen gas is boosted in the compressor 18 and then flows through the eighth flow passage 16l to be stored in the second tank portion 20b.

During the second storage operation, the pressure of the hydrogen gas in the second tank portion 20b is monitored by the third sensor 33 (step ST34). In step ST34, when the pressure detected by the third sensor 33 has reached a preliminarily set second predetermined pressure (for example, 90 MPa), the second storage operation finishes. The second storage operation ends and then shifts to the differential pressure filling operation (step ST34 shifts to step ST35).

In the differential pressure filling operation of step ST35, the flow rate of the hydrogen gas discharged from the second tank portion 20b is regulated by the flow regulating valve 27 and flows through the ninth flow passage 16m to the compressor 18 and the third flow passage 16c to be filled in the pressure accumulators 12a, 12b. In the differential pressure filling operation, the inlet and discharge valves of the compressor 18 are opened and the hydrogen gas is not compressed in the compressor 18.

In the differential pressure filling operation, the pressure P2 at the outflow end 16h is monitored by the second sensor 32 (step ST36). In step ST36, when the detection value of the second sensor 32 has reached a predetermined value (for example, 90 MPa in FIG. 8), the differential pressure filling operation finishes.

As described above, only the differential pressure filling operation is conducted in the third embodiment. That is, in the case of supplying the hydrogen gas to the pressure accumulators 12a, 12b, the supply of the hydrogen gas by use of the pressure difference and the supply of the hydrogen gas by use of the compression by the compressor 18 are not conducted at the same time. Therefore, as in the first and second embodiments, a complicated control for filling of the hydrogen gas into the pressure accumulators 12a, 12b by the gas-filling apparatus 10 can be avoided. Additionally, in the third embodiment, the storage portion 20 includes the first and second tank portions 20a, 20b, the pressures of which are different from each other; thereby, a range of pressure increase required for the compressor 18 when the hydrogen gas is supplied to a single tank portion can be reduced. As a result, in comparison to a configuration in which the pressure of the hydrogen gas in the storage portion 20 is directly increased to a predetermine pressure (corresponding to the second predetermined pressure), the number of compression stages of the compression chamber of the compressor 18 can be reduced.

In the third embodiment, in the event that the pressure of the hydrogen gas in the second tank portion 20b is likely to be decreased compared to the pressure of the hydrogen gas in the pressure accumulators 12a, 12b in the course of the differential pressure filling operation, the differential pressure filling operation is returned to the second storage operation (step ST33) and the hydrogen gas may be resupplied to the second tank portion 20b. Further, in the event that the compression ratio of the compressor 18 is likely to exceed the compression ratio limit Pr in the course of the second storage operation, the second storage operation is returned to the first storage operation (step ST31) and the hydrogen gas may be resupplied to the first tank portion 20a.

Figure 9:
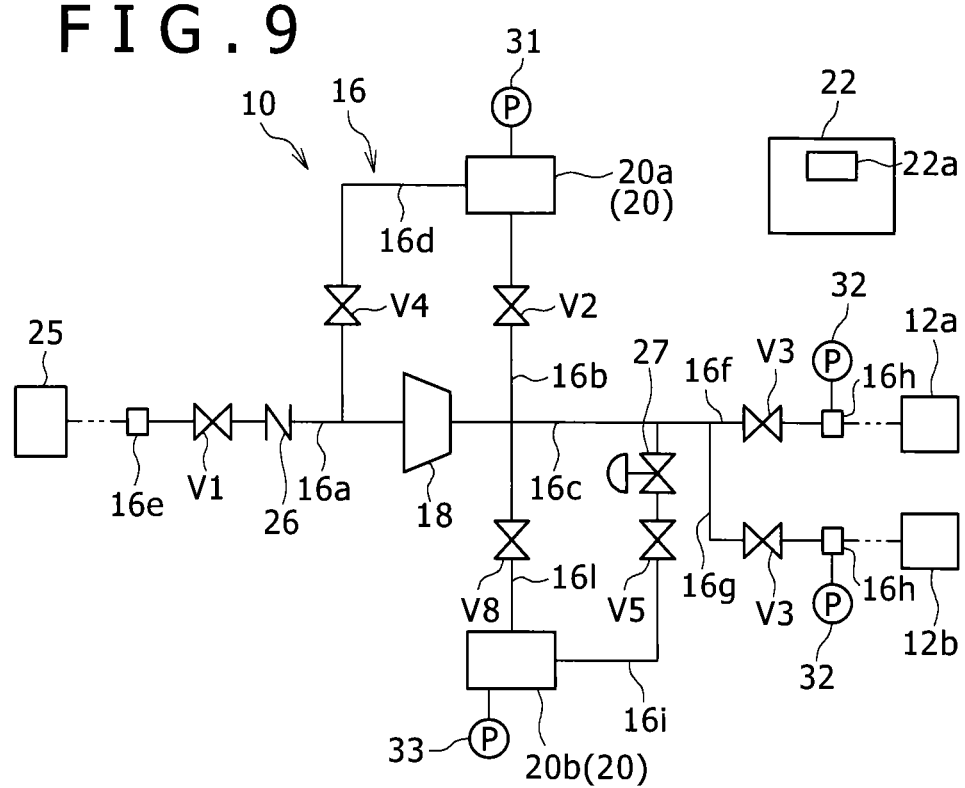
FIG. 9 is a view schematically illustrating an entire configuration of the gas-filling apparatus according to a modified example of the third embodiment of the present invention.
Figure 10:
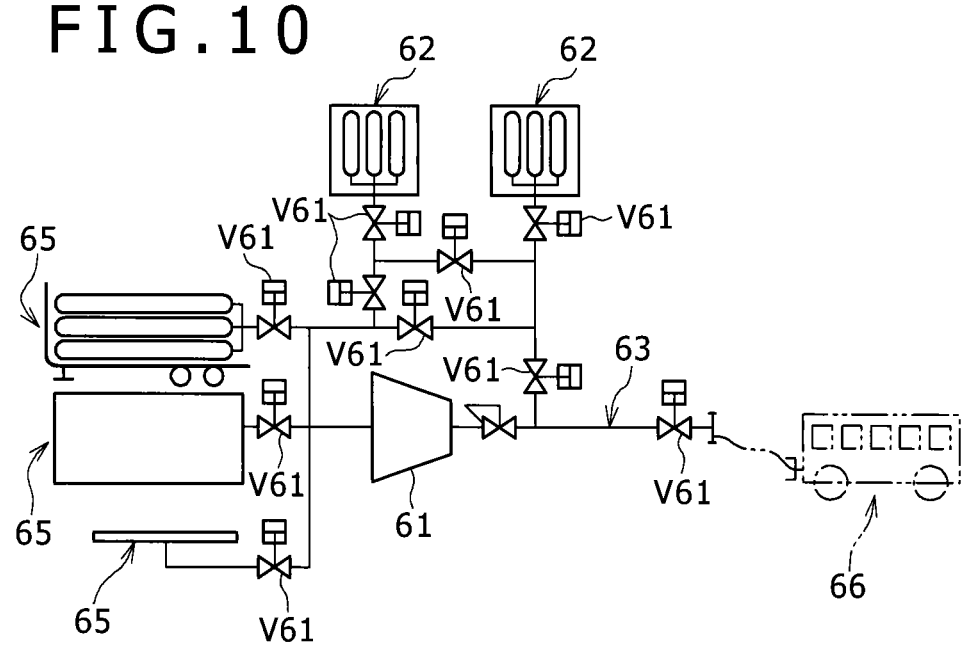
FIG. 10 is a view schematically illustrating an entire configuration of a conventional gas-filling apparatus.

An operation of the gas-filling apparatus 10 according to a modified example of the third embodiment is illustrated in FIG. 9. In the modified example of the third embodiment, the gas-filling apparatus 10 may be provided with a fifth flow passage 16i in which a fifth on-off valve V5 is arranged. The fifth flow passage 16i connects the second tank portion 20b of the storage portion 20 to the third flow passage 16c. Meanwhile, the ninth flow passage 16m is omitted.

According to the aforementioned third embodiment, the ninth on-off valve V9 is controlled to be opened in the differential pressure filling operation. Alternatively, according to the modified example of the third embodiment, the fifth on-off valve V5 is opened in the differential pressure filling operation; thereby, the hydrogen gas is supplied from the second tank portion 20b to the pressure accumulators 12a, 12b. The flow regulating valve 27 is not arranged adjacent to the suction portion of the compressor 18 but is arranged in the fifth flow path 16i or at a downstream side of the fifth flow path 16i (that is, adjacent to the pressure accumulators 12a, 12b).

In the modified example of the third embodiment shown in FIG. 9, only the differential pressure filling operation is conducted; thereby, a complicated control for filling of the hydrogen gas into the pressure accumulators 12a, 12b by the gas-filling apparatus 10 can be avoided. In addition, in the event that an on-off valve is arranged between the second flow passage 16b and the fifth flow passage 16i and between the eighth flow passage 16l and the fifth flow passage 16i in the third flow passage 16c, the hydrogen gas from the gas supply source 25 can be stored through the compressor 18 to the first tank portion 20a, that is, the first storage operation can be conducted, in conjunction with filling the pressure accumulators 12a, 12b with the hydrogen gas from the second tank portion 20b.

The present invention is not limited to the aforementioned embodiments and various modifications and alternations of the invention may be made without departing from the scope and spirit of the invention. For example, the present invention includes the configuration connectable to the pressure accumulators 12a, 12b used for supplying the hydrogen gas through the dispenser to the vehicle but it is not limited to such configuration. According to the present invention, a tank arranged in a tank mounting unit such as a fuel-cell vehicle may function as a pressure accumulator. That is, the present invention may be configured so that the dispenser is arranged in the gas flow passage 16 and that the outflow end 16h of the gas flow passage 16 is configured to be connectable to a flow passage leading to the tank arranged in the tank mounting unit.

As in the first embodiment, the first compression filling operation in which the hydrogen gas sent from the gas supply source 25 is compressed in the first compressor 18 to be filled in the pressure accumulator 12a and the second compression filling operation in which the hydrogen gas sent from the storage portion 20 is compressed in the first compressor 18 to be filled in the pressure accumulator 12a can be conducted in the second embodiment. In this case, the first compression filling operation is conducted; thereafter, the second compression filling operation is conducted. In the second embodiment, the storage portion 20 can be configured only by a single large-capacity container.

In the third embodiment, in the event that the pressure in the second tank portion 20b of the storage portion 20 extremely drops in the course of the differential pressure filling operation, the hydrogen gas can be compressed by the compressor 18 to be filled into the pressure accumulators 12a, 12b. That is, after the differential pressure filling operation in which the hydrogen gas stored in the storage portion 20 is discharged therefrom through the outflow ends 16h to the pressure accumulators 12a, 12b by the pressure difference, the compression filling operation in which the hydrogen gas stored in the storage portion 20 is compressed by the compressor 18 to be discharged from the outflow end 16h can be conducted.

In the first, second, and third embodiments, the first sensor 31 is configured to be arranged at the storage portion 20 but it is not limited to such configuration. For example, the first sensor 31 can be arranged in the second flow passage 16b or the fourth flow passage 16d so as to be located adjacent to the storage portion 20.

In the first, second, and third embodiments, the second sensor 32 is configured to detect the pressure of the hydrogen gas at the outflow end 16h but it is not limited to such configuration. For example, the second sensor 32 can be configured to detect the pressure of the hydrogen gas in the pressure accumulators 12a, 12b.

In the first embodiment, a value smaller than the compression ratio limit Pr is set as the storing start threshold and the second compression filling operation can be shifted to the after-filling storage operation on the basis of this value. In addition, a value equal to or greater than the lower limit Pmin obtained by dividing the target pressure by the compression ratio limit Pr is set as the storing start threshold and the after-filling storage operation can be conducted on the basis of the pressure P1 of the first sensor 31, and likewise in shifting between the compression filling operation and the after-filling storage operation in the second embodiment. Furthermore, in the third embodiment, after the hydrogen gas is compressed to the first predetermined pressure by the compressor 18 to be stored in a single tank portion or plural tank portions, this compressed hydrogen gas can be compressed to the second predetermined pressure by the compressor 18 to be stored again in the single tank portion or the plural tank portions.

What is claimed is:
1. A gas-filling apparatus comprising:
  a gas flow passage including an inflow end to which a gas supply source is connectable and an outflow end to which a pressure accumulator is connectable;
  a compressor connected to the gas flow passage;
  flow control means associated with the gas flow passage for controlling a gas flow in the gas flow passage;
  a storage portion connected to the gas flow passage; and
  an operation control portion for executing a control for controlling the flow control elements to perform a first compression filling operation in which a gas supplied from the gas supply source connected to the inflow end is compressed by the compressor to be discharged from the outflow end and a second compression filling operation in which the gas stored in the storage portion is compressed by the compressor to be discharged from the outflow end,
wherein the operation control portion is configured to conduct the first compression filling operation until a pressure of the gas at the outflow end or a pressure corresponding to the pressure of the gas at the outflow end reaches a predetermined pressure and to conduct a control for shifting the first compression filling operation to the second compression filling operation when the pressure of the gas at the outflow end or the pressure corresponding to the pressure of the gas at the outflow end has reached the predetermined pressure.

2. The gas-filling apparatus according to claim 1, wherein in the second compression filling operation, in a case where a ratio of the pressure of the gas at the outflow end relative to a pressure of the gas in the storage portion is equal to or greater than a storing start threshold preliminarily set for said ratio, the operation control portion conducts a storage operation for storing the gas in the storage portion on the basis of said ratio.

3. The gas-filling apparatus according to claim 1, wherein said flow control means are on-off valves and wherein the gas flow passage includes a first flow passage in which a first on-off valve is arranged and which connects the inflow end to a suction portion of the compressor, a second flow passage in which a second on-off valve is arranged and which connects a discharge portion of the compressor to the storage portion, a third flow passage in which a third on-off valve is arranged and which connects the second flow passage to the outflow end, and a fourth flow passage in which a fourth on-off valve is arranged and which connects the storage portion to the suction portion of the compressor so that the storage portion and the suction portion are communicated with each other, and
wherein when conducting the second compression filling operation, the operation control portion allows the fourth and third on-off valves to be opened and allows the first and second on-off valves to be closed.

4. The gas-filling apparatus according to claim 1, further comprising at least one pressure sensor positioned to sense the pressure of the gas at the outflow end and a pressure of the gas in the storage portion.

5. The gas-filling apparatus according to claim 1, wherein in the second compression filling operation, in a case where a pressure of the gas in the storage portion is equal to or less than a storing start threshold preliminarily set for the pressure of the gas in the storage portion, the operation control portion conducts a storage operation for storing the gas in the storage portion on the basis of the pressure of the gas in the storage portion.

6. A gas-filling apparatus comprising:
a gas flow passage including an inflow end to which a gas supply source is connectable and an outflow end to which a pressure accumulator is connectable;
a compressor connected to the gas flow passage;
flow control means associated with the gas flow passage for controlling a gas flow in the gas flow passage
a storage portion connected to the gas flow passage; and
operation control means for controlling the flow control means to execute a first compression filling operation in which a gas supplied from the gas supply source connected to the inflow end is compressed by the compressor to be discharged from the outflow end, until a pressure of the gas at the outflow end or a pressure corresponding to the pressure of the gas at the outflow end reaches a predetermined pressure, and to thereafter shift the first compression filling operation to a second compression filling operation in which the gas stored in the storage portion is compressed by the compressor to be discharged from the outflow end.

7. The gas-filling apparatus according to claim 6, wherein in the second compression filling operation, in a case where a ratio of the pressure of the gas at the outflow end relative to a pressure of the gas in the storage portion is equal to or greater than a storing start threshold preliminarily set for said ratio, the operation control means conducts a storage operation for storing the gas in the storage portion on the basis of said ratio.

8. The gas-filling apparatus according to claim 6, wherein said flow control means are on-off valves and wherein the gas flow passage includes a first flow passage in which a first on-off valve is arranged and which connects the inflow end to a suction portion of the compressor, a second flow passage in which a second on-off valve is arranged and which connects a discharge portion of the compressor to the storage portion, a third flow passage in which a third on-off valve is arranged and which connects the second flow passage to the outflow end, and a fourth flow passage in which a fourth on-off valve is arranged and which connects the storage portion to the suction portion of the compressor so that the storage portion and the suction portion are communicated with each other, and
wherein when conducting the second compression filling operation, the operation control means allows the fourth and third on-off valves to be opened and allows the first and second on-off valves to be closed.

9. The gas-filling apparatus according to claim 6, wherein in the second compression filling operation, in a case where a pressure of the gas in the storage portion is equal to or less than a storing start threshold preliminarily set for the pressure of the gas in the storage portion, the operation control means conducts a storage operation for storing the gas in the storage portion on the basis of the pressure of the gas in the storage portion.

* * * * *